US006469805B1

United States Patent
Behlok

(10) Patent No.: US 6,469,805 B1
(45) Date of Patent: Oct. 22, 2002

(54) POST RASTER-IMAGE PROCESSING CONTROLS FOR DIGITAL COLOR IMAGE PRINTING

(75) Inventor: Eli J. Behlok, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/216,524

(22) Filed: Dec. 18, 1998

(51) Int. Cl.$^7$ .............................................. G06K 15/00
(52) U.S. Cl. ....................................... 358/1.9; 358/1.16
(58) Field of Search ........................ 358/1.9, 536, 456, 358/1.16, 404, 444, 516, 534; 382/169

(56) References Cited

U.S. PATENT DOCUMENTS

| | | | | |
|---|---|---|---|---|
| 5,606,395 A | 2/1997 | Yang et al. | ..................... | 399/81 |
| 5,706,457 A | 1/1998 | Dwyer | ........................ | 395/349 |
| 5,883,979 A | 3/1999 | Beretta | ........................ | 382/251 |
| 6,029,234 A | 2/2000 | Yamaguchi | .................. | 711/167 |

OTHER PUBLICATIONS

"SX1000 Pro/D Digital Front Ends for the Xerox DocuColor 40 User Guige" Part 2 Xerox Corp., May 12, 1996, pp 11–25 to 11–28.

Primary Examiner—Jerome Grant, II
(74) Attorney, Agent, or Firm—Fay, Sharpe, Fagan, Minnich & McKee, LLP

(57) ABSTRACT

A digital color image printing apparatus is disclosed which adjusts image characteristics of a printed image such as lightness/darkness, midtone contrast, highlight emphasis, shadow emphasis, and color cast. An input station generates an input image in a page description language. A raster-image processor decomposes the input image into a post-processing contone image. A user interface provides input signals to adjust at least one of the image characteristics of the post-processing contone image. An image control detects the input signals and adjusts at least one of the image characteristics of the post-processing contone image. A half-toner converts the adjusted post-processing contone image into a raster image. A printer prints the adjusted post-processing contone image.

The invention provides a user with the ability to modify the characteristics of a printed document without having to perform raster image processing again. Further, the adjustments are easily separable from the document to allow the user to return to the original document at a later date.

16 Claims, 3 Drawing Sheets

POST RASTER-IMAGE PROCESSING CONTROLS FOR DIGITAL COLOR IMAGE PRINTING

FIELD OF THE PRESENT INVENTION

The present invention is directed to the digital color imaging arts. It finds particular application to a system and method of printing a digital color image and will be described with particular reference thereto. Of course, it is to be appreciated that the invention is also applicable to other environments and applications, such as other digital rendering systems, e.g., image setters, direct-to-plate systems, and video displays.

BACKGROUND OF THE PRESENT INVENTION

In commercial printing, a typical electronically-prepared job involves an art director, a professional photographer, a graphic artist, a document composition and layout specialist, a proofing system operator, a printing press operator, and the customer. The art director develops a concept for the document, the photographer shoots a large volume of the best possible pictures of the subject matter, and the customer approves the images and concept of the pieces. The graphic artist draws and colors the complex illustrations, and the document layout specialist assembles the text, graphics, and images into a source file for film making. This file, usually located on a storage disk, is called a source file.

The source file is typically an array of pixel information for each of the imaging colors red, green and blue (RGB). The source file could also be an array of pixel information for each of the imaging colors cyan, magenta, yellow and black (CMYK). Each pixel is represented as an intensity value, from 0 to 255, of each the three colors.

To print the file onto film or paper, the source file is converted into a file of instructions in page description language (PDL). Following this, a digital front end processes or decomposes the PDL file into a contone image of 8 bits per pixel or a byte map. This process or decomposition is known as raster-image processing (RIP). Then, the contone image is sent to a print engine containing a half toner or screen generator. Typically, the half toner renders a raster image for each of the print colors cyan, magenta, yellow and black (CMYK). Each raster image is composed of pixel data of 1 bit/pixel. Thus, each bit is simply an instruction whether or not to place a dot of color at a particular point on an output page.

To aid in the conversion of three-dimensional RGB signals to four-dimensional CMYK signals, a multi-dimensional look-up table is commonly used. The look-up table converts each digital RGB color signal value to a corresponding digital CMYK value before being received by the printer.

A printer which has an ideal dye behavior has a one-to-one correspondence of cyan-to-red, magenta-to-green, and yellow-to-blue. This means that when printed, the cyan ink will only absorb red light, the magenta ink will only absorb green light, and the yellow ink will only absorb blue light. However, printers inherently have a non-ideal dye behavior and therefore have a complex non-linear colorimetric response. Interactions between the cyan, magenta, and yellow inks exist which result in unwanted absorptions of reds, greens, and blues. Even once a printer is calibrated such that a range of input digital CMYK values produce the proper colors, the full spectrum of CMYK values and printed colors is not accurate. In other words, the colors asked to be printed and the actual colors printed are not the same.

This discrepancy arises because the relationship between digital values that drive the printer and the resulting colorimetric response is a complex non-linear function. Modeling the colorimetric response to achieve linearity across the available spectrum usually requires many parameters. Therefore, the relationship between the CMYK values driving the printer and the measured colorimetric values of the resulting printed patch is often not characterizable by a simple function or model. The number of measurements required to characterize the printer adequately, can be 1,000 or more measurements. Typically, a color correction look-up table is built which approximates the mapping between RGB space and CMYK values. More specifically, the color correction look-up table corrects for non-linearities and unwanted absorptions of inks such that the printer prints the true corresponding color.

Each RGB coordinate is typically represented by an 8-bit red value, an 8-bit green value, and an 8-bit blue value. Although the RGB coordinate is capable of addressing $256^3$ locations, each look-up table for each of the RGB colors is typically partitioned into a smaller size, such as 16×16×16 (4096) table locations. The number of table locations is selected based on the desired accuracy of the look-up table compared to the expense of storing a large number of values.

After CMYK values are obtained, they are adjusted using tone reproduction curves (TRCs) to adjust the aesthetic result of the printed image. The TRCs are a set of data defining the input to output relationship for each separation for all possible input values. Typically, the TRCs are represented by look-up tables. By transforming the CMYK values, the color density of the output image, as represented by the output data, is adjusted. In this regard, original documents are created using scanned images. In a digital printing machine, the image processing system can greatly impact the contrast of the output image. To assure high quality at the output printing device, it is desirable to know the contrast of the image that has been scanned so that the TRCs may be adjusted in image processing to reproduce the image with a desired appearance.

One way of obtaining this contrast information is to generate a grey level histogram, which gives an easy to read measure of the image contrast. The image or grey level histogram describes the statistical distribution of grey levels of an image in terms of the number of pixels at each grey level. In other words, the histogram is a representation of the number of pixels within an image that are associated with a certain grey level.

A histogram can be represented graphically with intensity on the horizontal axis from 0 to 255, if an eight-bit per pixel sampling resolution is utilized, and the number of pixels on the vertical axis. Using this graphical representation, a histogram can illustrate whether an image is basically dark or light. It is important to know that when an image is represented by histogram, all spatial information is lost. The histogram specifies the number of pixels of each grey level but gives no indication where these pixels are located in the image. In other words, very different images may have very similar histograms.

Conventionally, when creating a histogram of the image, a digital image processing system samples a document, collects intensity data from the document, and uses this information to determine the document's background value. In such conventional systems, the computed background value of the document represents the average intensity of the document.

Achieving accurate scanner to printer color accuracy and optimizing contrast are two aspects of digital color image processing. Another aspect of digital color image processing is adjusting a balance of characteristics of the printed image to aesthetically improve the appearance of the reproduced image. Examples of such characteristics of the printed image are the lightness/darkness, midtone contrast, highlight emphasis, shadow emphasis, and color cast of the image.

Current digital imaging machines typically provide operators with the ability to adjust the appearance of the printed image. Generally, digital machines offer control over output lightness and darkness, sharpness, and contrast. Lightness and darkness adjustments, for example, vary hue along a scale from black to white. In addition, operators can adjust the balance between colors and overall amount of color on output copies.

Color and tone corrections to the document may be applied to the images and graphics at a client workstation. These corrections are applied by the graphic artist or layout specialist. More specifically, an operator is able to adjusts the amounts of the three process colors, cyan, magenta, and yellow (CMY)K to shift the color balance or image characteristics of the printed image to a preference. Generally, these factors can only be changed by undergoing raster-image-processing again. This is time consuming (taking up to 15 minutes or in some instances) and, thus, expensive. Nevertheless, greater control by an operator of a printing system is desirable because print appearance is often subjective. Further, it is often difficult to determine the most preferable print appearance without first seeing a printed image.

It would therefore be desirable to provide a printing system operator with the ability to apply tone and color modifications without having to send the job back to another person in a different department, such as a graphic artist or layout/color correction specialist, to make changes. Further, it would be desirable to avoid re-RIPping the document to introduce tone and color modifications to the document. Thus, it is desirable to save an intermediate form of the digital image data that is still modifiable and capable of being converted to device-specific and color-specific half-tones at printer speeds. This would result in improved productivity and reduced cycle time.

SUMMARY OF THE PRESENT INVENTION

In accordance with one aspect of the present invention, a digital image printing apparatus is provided which adjusts image characteristics of a displayed image. An input station generates an input image. An image processing station processes the input image and generates a post-processing contone image therefrom. A user interface provides input signals to adjust at least one of the image characteristics of the post-processing contone image. An image control detects the input signals and adjusts at least one of the image characteristics of the post-processing contone image. A display displays the adjusted post-processing contone image.

In a more limited aspect of the present invention, the image processing station includes a raster-image processor for decomposing a representation of the input image in page description language into the post-processing contone image. Further, the apparatus includes a half-toner for converting the adjusted post-processing contone image into a raster image. Still further, the display is a digital printer for printing the raster image.

In accordance with another aspect of the present invention, a method is disclosed for adjusting image characteristics of a input image that is represented in a page description language (PDL image). The PDL image is converted into a post-processing contone image. A tone-reproduction curve (TRC) is selected based on a user input. The post-processing contone image is mapped into an adjusted post-processing contone image using the TRC. The adjusted post-processing contone image is then displayed.

In a more limited aspect of the present invention, the PDL image is raster-image processed into the post-processing contone image. The adjusted post-processing contone image is half-toned into a raster image. The raster image is printed.

One advantage of the present invention is that it provides a printing system operator with the ability to apply tone and color modifications to a job without having to send it back to another person in a different department or to re-RIP the job.

Another advantage of the present invention is that it allows a customer to quickly apply a plurality of TRC modifications and print differing documents therefor. By examining the plurality of printed documents, a customer can select the best TRC modification for the job.

Yet another advantage is that it allows a user to modify the document and then, any time later, return to the original default setting without re-RIPping.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
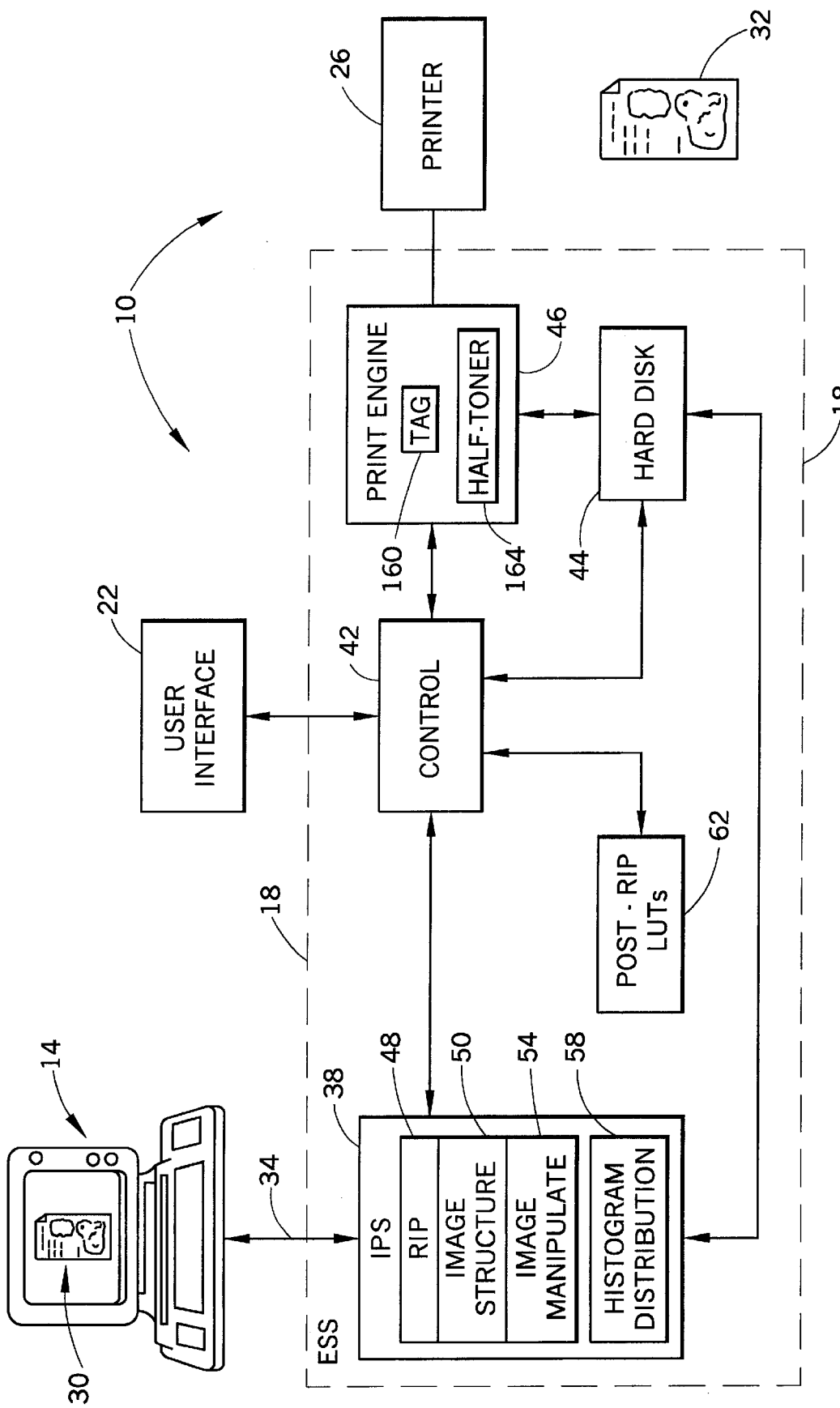
FIG. 1 is a block diagram of a digital color image printing system which allows post-RIP TRC modification of an image in accordance with the present invention.

With reference to FIG. 1, an exemplary system for carrying out the present invention is a digital color image printing system 10. The printing system includes a remote computer 14, a control system, which is known as an electronic subsystem (ESS) 18, a user interface (UI) 22, and a printer 26. The ESS is a programmable microprocessor system, as exemplified by U.S. Pat. No. 4,485,156 and its references which are hereby incorporated by reference. An operator creates a digital document 30 on the computer (or input station). The ESS processes and adjusts the image characteristics of the document, and the printer prints out a representation of the adjusted document 32.

More particularly, an operator, such as a graphics artist, runs a composition program on the computer to create the digital document which contains objects such as color images, graphics and/or text. The operator may use scanned images, computer programs, or other generation means to create the digital document. Typically, such generation means generates three-dimensional color signals, i.e., red, green, blue (RGB) to represent the objects; however, the generation means may also generate other combinations of colors such as cyan, magenta, yellow and black (CMYK). The digital document is displayed on the monitor of the computer as an array of grey scale pixel values (ranging from 0 to 255) representing the intensity of each of the plurality the colors at each pixel location. As such, this document is known as a continuous tone or contone image and shall be called herein a native file. Upon receiving an instruction to print the file, the composition program and a print driver converts the contone image or native file into a page description language (PDL), e.g. Postscript. The PDL file includes contone data (for images), text data, and graphic data.

The PDL file is transferred to the ESS via a network 34. Of course, the PDL file may be transferred to the ESS in other ways such as being physically transferred on a floppy disk or other storage media.

The ESS controls all image processing, machine steps and functions described herein, and others, including the operation of the printer. To do this, the ESS includes an image processing station (IPS) 38, an image control 42, a hard disk 44, and a print engine 46.

The IPS includes a RIPping processor 48 which decomposes or RIPs the PDL file into a contone image, i.e., a byte map. This process can take more than fifteen minutes depending on the size and complexity of the PDL file and the power of the processing hardware and software.

Further, the IPS includes an image structure analysis processor 50 which selectively performs color-space conversion, black page detection, background detection, segmentation, auto-windowing, auto-image enhancement and the like. Still further, the IPS includes an image manipulation processor 54 which selectively performs window tagging, rotation, filtering, scaling, background suppression, color adjustment, cropping and masking, annotation, and the like. To optionally aid in the adjustment of contone images, the IPS includes a histogram distribution processor 58 which selectively generates a histogram distribution representing a frequency of each grey value in a contone image. The processing and control functions of the ESS are performed by a combination of software, which is resident on the hard disk, and applied specific integrated chips (ASICs).

Because image quality is subjective, it is desirable for a customer to incrementally adjust a balance of image characteristics of the printed image to enhance its appearance and then review the printed image to determine whether it is satisfactory. Alternatively, it is desirable for a customer to quickly select a best image from a plurality of printed images, each having a slightly different balance of image characteristics. These adjustments are permitted by the user interface and image control.

The user interface 22 is in communication with the image control 42 to allow modification of certain characteristics of the printed image. 30 such as lightness/darkness, contrast, highlights, shadows, and color cast. In this regard, the operator actuates the appropriate keys on the user interface to adjust the parameters of a print job. The user interface may be a touch screen, or any other suitable control panel, providing an operator interface with the system. The output signal from the user interface is transmitted to the image control. The image control adjusts the characteristics of the printed image by modifying the TRCs with which the post-RIP contone file is printed. Rather than actually modifying the TRCs, the image control selects the appropriate TRCs, each of which is represented as 1-dimensional look-up tables (LUT), from post-RIP LUT memory 62. In the preferred embodiment, the TRC modifications are represented as 1, 2, 3 or 4 one-dimensional LUTs, each for one of the CMYK colors.

Figure 2:
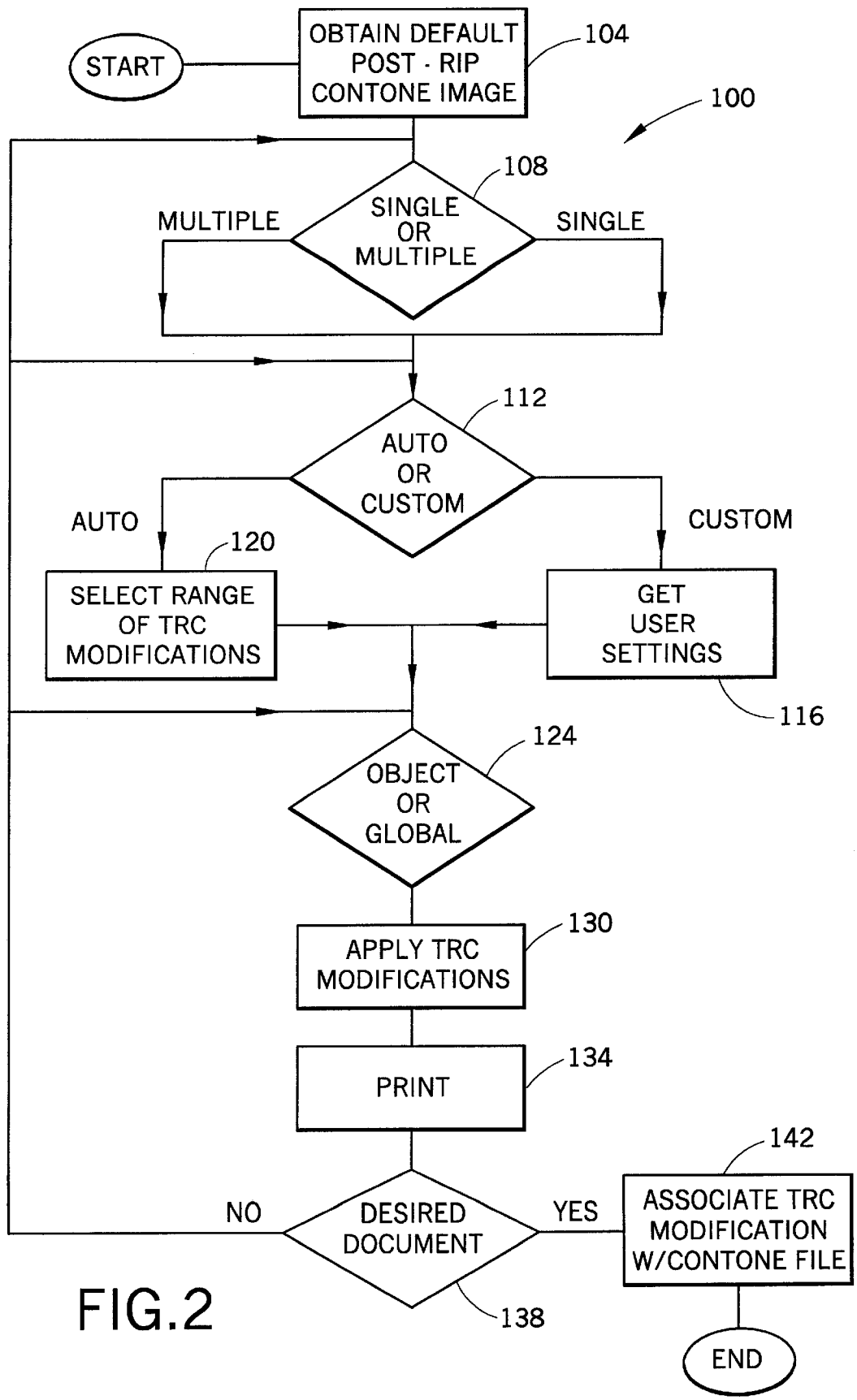
FIG. 2 is flowchart of the process for modifying an image at a user interface in accordance with the present invention.

With referenced to FIG. 2, an algorithm 100 for modifying the TRCs the image control begins with receiving the post-RIP contone file from the IPS 104. The user selects whether to print a single TRC modification or to print multiple TRC modifications all at once 108. In single mode, the user may incrementally adjust the image after it is printed. In multiple mode, the user can quickly print multiple images without re-RIPing, each image being slightly different from the others, and select the best one therefrom.

The user selects whether to customize the TRC modifications or have the control system select appropriate TRC modifications 112. If the user chooses to customize, then the user must input or select the desired TRC modifications 116. This feature is for the more sophisticated users.

If the user prefers automatic selection of the TRC modifications, then the control system determines the appropriate TRC modifications 120. At the user interface, the user selects adjustments to the characteristics of the printed image, such as the lightness/darkness, midtone contrast, highlight emphasis, shadow emphasis, and color cast of the image. The appropriate TRC modifications are accessed from the LUT memory 62 (see FIG. 1). As indicated above, the LUT memory contains a plurality of one-dimensional look up tables for mapping an input contone pixel value to an output or modified contone pixel value.

In the preferred embodiment, the printing system prints a user-selectably number of variations of the same document, each with different TRC modifications. By way of example, if the user selects five variations, a first document is printed with no TRC adjustment. In this case, a unity look-up table maps each contone input value to the same contone output value. This is the default setting. Second, third, fourth, and fifth documents are printed with TRC modifications.

Optionally, the image control selects predefined TRCs without analysis based on histograms. Predefined TRCs allow the user to automatically lighten, darken, enhance contrast (increase "snap"), enhance highlights, enhance shadows and remove color cast in a file. In the present embodiment, the TRC modifications are applied within the ESS. However, it is to be appreciated that the TRC modifications may be applied at a print server or at another print engine.

Further, optionally, the automatic selection is performed by a histogram analysis of the contone image. The image control accesses the histogram distribution processor 58 (see FIG. 1) for a reading of the histogram of the post-RIP contone image. By identifying the histogram of the post-RIP contone image and selecting TRCs to modify that histogram, the image may be enhanced to correct for image degradations such as under or over-exposure, poor lighting, etc. In the preferred embodiment, the TRC modifications for the enhancement are selected to reveal the intensity variations within the image that may not be visible until after the transformation. In other words, based on the histogram of the post-RIP contone image, the appropriate TRC modifications are selected which favorably redistribute the histogram of the post-RIP contone image. Further analysis of histograms is described, for example, in U.S. Pat. No. 5,751,848 entitled "A System and Method for Generating and Utilizing Histogram Data From a Scanned Image" which is assigned to the present assignee and is incorporated herein by reference. It is to be appreciated, however, that other methods may be used to automatically select or generate appropriate TRC modifications.

Next the user, may select whether the TRC modifications are to be applied globally to the document or to a particular object on the document, such as an image, a graphic, or a block of text 124. This may require further image processing which is to be appreciated by those skilled in the art. Then, the image control or print engine modifies the post-RIP contone image file with the selected TRC modifications 130. The document or documents are printed 134 and reviewed by the user. In the case of multiply printed documents, the user or customer quickly compares the documents and determines the one that has the best balance of imaging characteristics. The user determines whether any document is satisfactory 138. If no document is satisfactory, the user may remodify the TRCs. If a document is satisfactory, the user indicates this on the user interface. The image control then separably associates the desired TRC modifications with the post-RIP contone file 142. This association permits a user to print out more of the same document without redoing the selection process. At the same time, the separation of the TRCs and the post-RIP contone file permits a user to begin with the default post-RIP contone file if a new balance of imaging characteristics is desired.

With reference to FIG. 1, in the preferred embodiment, the TRC modifications to the post-RIP contone file are stored as object tags. There may be multiple object tags associated with the post-RIP contone file for various blocks of images, graphics and text. Prior to printing, the object tags are used to load the selected lookup tables into random access memory of the print engine. In an alternative embodiment, the TRC modifications are stored as the selected LUTs. In the print engine 46, an object tag processor 160 reads the object tags associated with the contone data, loads the selected TRCs from the post-RIP LUT memory 62, and applies the TRCs to the different objects of the file. In an alternative embodiment, which is less advantageous, TRC modifications are applied to the original contone pixel data itself at the RIP processor.

The print engine includes a half-toner or screen generator 164 which decomposes the adjusted, post-RIP contone image into raster images for printing. Each raster image is a bit map image or series of on and off instructions to tell the printer where to place an ink or toner dot of a particular process color on a sheet of paper. This results in the printed image 32.

Figure 3:
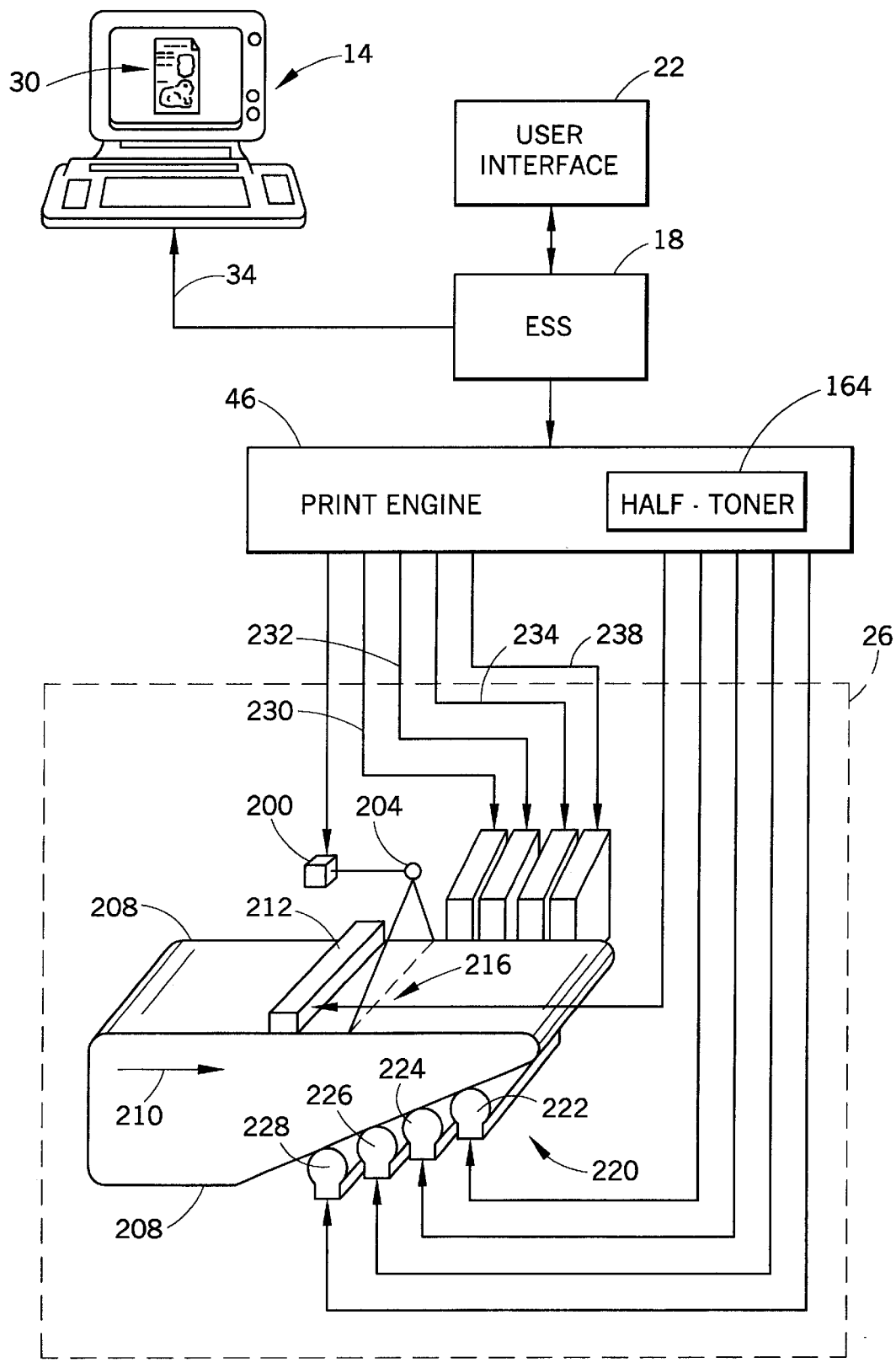
FIG. 3 is a diagram of the digital color image printing system of FIG. 1 including an elevational view of the printer.

With reference to FIG. 3, the printer includes a raster output scanner (ROS) 200 which creates the output print image. The ROS preferably includes a laser which may be a solid state device and a rotating polygon mirror 204. The ROS illuminates, via the mirror, the portion of a photoconductive belt 208 at a certain resolution, such as 400 pixels per inch, to achieve a set of subtractive primary latent images. The photoconductive belt moves in direction 210. The ROS will expose the photoconductive belt to record four latent images which correspond to the signals transmitted from the print engine 46. One latent image is developed with cyan developer material. Another latent image is developed with magenta developer material, a third latent image is developed with yellow developer material, and a fourth latent image is developed a black developer material. These developed images are transferred to a print sheet in superimposed registration with one another to form a multicolored image on the print sheet. This multicolored image is then fused to the print sheet forming the color print 32 (see FIG. 1).

Initially, a portion of photoconductive belt passes by a corona generating device 212 which charges photoconductive belt to a relatively high, substantially uniform potential.

Next, the charged photoconductive surface is rotated to an exposure station, indicated generally by the reference number 216. The exposure station receives a modulated light beam corresponding to information derived by the RIS. The modulated light beam impinges on the surface of photoconductive belt. The beam illuminates the charged portion of the photoconductive belt to form an electrostatic latent image. The photoconductive belt is exposed three or more times to record three or more latent images thereon.

After the electrostatic images have been recorded on the photoconductive belt, the belt advances the latent images to a development station, indicated generally by he reference number 220. The development station includes four individual developer units, 222, 224, 226 and 228. The developer units are of a type generally referred to in the art as "magnetic development subsystems." Typically, a magnetic donor development system employs a magnetizable developer material including magnetic carrier granules having toner particles adhering triboelectrically thereto. The developer material is continually brought through a directional flux field to form a donor of developer material. The developer material is constantly moving so as to continually provide the donor with fresh developer material. Development is achieved by bringing the donor of developer material in sufficiently close vicinity of the photoconductive surface. The developer units 222, 224, and 226 apply toner particles of a specific color which corresponds to the complement of the specific color separated electrostatic latent image recorded on the photoconductive surface. The developer units are controlled by toner dispenser motor controls 230, 232, 234, and 236.

The color of each of the toner particles is adapted to absorb light within a preselected spectral region of the electromagnetic wave spectrum. For example, an electrostatic latent image formed by discharging the portions of charge on the photoconductive belt corresponding to the green regions of the document will record the red and blue portions as areas of relatively high charge density on photoconductive belt, while the green areas swill be reduced to a voltage level ineffective for development. The charged areas are then made visible by having developer unit 222 apply green absorbing (magenta) atoner particles onto the electrostatic latent image recorded on photoconductive belt. Similarly, a blue separation is developed by the developer unit 224 with blue absorbing (yellow) toner particles, while the red separation is developed by the developer unit 226 with red absorbing (cyan) toner particles. The developer unit 228 contains black toner particles and may be used to develop the electrostatic latent image formed from a black and white document or to provide undercolor removal. Each of the developer units is moved into and out of an operative position. In the operative position, the magnetic donor is substantially adjacent the photoconductive belt, while in the nonoperative position, the magnetic donor is spaced therefrom. During development of each electrostatic latent image, only one developer unit is in the operative position, the remaining developer units are in the nonoperative position.

After development, the toner image is moved to a transfer station (not shown). In the transfer station, the toner image is transferred to a sheet of support material, such as plain paper. At transfer station, the sheet is moved into contact with the photoconductive belt. The sheet moves in a recirculating path for three or four cycles. In this way, three or four different color toner images are transferred to the sheet in superimposed registration with one another. After the last transfer operation, the sheet is transported to a fusing station (not shown) where the transferred toner image is permanently fused to the sheet. The TRC modified, post-RIP contone data may be stored on a hard disk drive 434, a floppy disk, or transferred over a network for later or remote printing. It is to be appreciated by those skilled in the art that additional processors or processing steps may be added to give the options of storing or transferring the image data either subsampled or non-subsampled in either a compressed or uncompressed format. Further, the invention may be practiced in other color spaces such as L*a*b* or monochrome.

As stated above, the ESS controls all image processing, machine steps and functions described herein, and others, including the operation of the printer. However, it is to be appreciated that in other embodiments, the ESS does not perform all image processing or control the printer. This is particularly the case where the stored adjusted, post-RIP contone file is brought to another printer for printing.

Post-RIP TRC modifications allow the production printing operator to change the tonal relationships in a file quickly without affecting the original contone pixel data. They can do this to match a contract proof, to correct tonal image defects, or to quickly apply several different TRCs and print them and then allow the customer to choose the preferred variation. In this work process, modifying the color or contrast in the file does not require sending the job back to the graphic arts department for corrections and does not require the file to be re-RIPped.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A digital image printing apparatus for adjusting image characteristics of a displayed image comprising:
    an input station for generating an input image;
    an image processing station for processing the input image and generating a post-processing contone image therefrom;
    a user interface for providing input signals to adjust at least one of the image characteristics of the post-processing contone image;
    an image control for detecting the input signals and adjusting at least one of the image characteristics of the post-processing contone image;
    a memory containing data representative of a tone-reproduction curve (TRC), wherein one of the image control and a printer engine accesses the TRC memory for appropriate TRCs and applies them to the post-processed contone image; and
    a display for displaying the adjusted post-processing contone image.

2. The apparatus as set forth in claim 1 further comprising a storage disk for storing the post-processed contone image with an associated tag indicating the desired TRCs for producing the adjusted post-processing contone image.

3. The apparatus as set forth in claim 2 wherein, upon receiving an appropriate signal from the user interface, the image control determines appropriate TRCs for adjusting the post-processed contone image.

4. The apparatus as set forth in claim 3 wherein the image control determines appropriate TRCs for adjusting the post-processed contone image based on a histogram distribution of one of the input image and post-processed contone image.

5. The apparatus as set forth in claim 2 wherein, based on only one input signal, the image control generates a plurality of different adjusted post-processed contone images.

6. The apparatus as set forth in claim 2 wherein the image control applies the appropriate TRCs to an object of the post-processed contone image.

7. A method for adjusting image characteristics of a input image that is represented in a page description language (PDL image), the method comprising:
    converting the PDL image into a post-processing contone image;
    selecting a tone-reproduction curve (TRC) based on a user input;
    mapping the post-processing contone image into an adjusted post-processing using the TRC;
    displaying the adjusted post-processing contone image.

8. The method as set forth in claim 7 wherein:
    the step of converting includes raster-image processing the PDL image into the post-processing contone image;
    half-toning the adjusted post-processing contone image into a raster image; and
    printing the raster image.

9. The method as set forth in claim 8 wherein the step of selecting includes:
    accessing a memory containing data representative of a tone-reproduction curve (TRC).

10. The method as set forth in claim 9 further including:
    storing the post-processed contone image with an associated tag indicating desired TRCs for producing the adjusted post-processing contone image.

11. The method as set forth in claim 10 wherein the step of selecting includes:
    accessing predefined TRCs based on a user's adjustment to one of a characteristic of the image of lightness/darkness, midtone contrast, highlight emphasis, shadow emphasis, and color cast.

12. The method as set forth in claim 11 wherein the step of selecting includes:
    generating a histogram distribution of a contone representation of the input image;
    determining an appropriate TRCs for adjusting the post-processed contone image based on the histogram distribution.

13. The method as set forth in claim 12 further including:
    selecting a plurality of TRCs to adjust the post-processing contone image to generate a plurality of different adjusted post-processing contone images using the plurality of TRCs based on an input signal from the user; and
    printing the plurality of different adjusted post-processing contone images.

14. The method as set forth in claim 13 wherein the step of mapping includes mapping only portion of the post-processing contone image.

15. The method as set forth in claim 7 wherein the TRC is represented by a look-up table.

16. A digital image printing apparatus for adjusting image characteristics of a displayed image comprising:
    an input station for generating an input image in page description language;
    a raster-image processor for decomposing the input image into a post-processing contone image;
    a user interface for providing input signals to adjust at least one of the image characteristics of the post-processing contone image;
    an image control for detecting the input signals and adjusting an image characteristic of the post-processing contone image; and a half-toner for converting the adjusted post-processing contone image into a raster image;

a digital printer for printing the raster image; and a storage media for storing the post-processed contone image with a separable, associated tag indicating a desired TRC for producing the adjusted post-processing contone image.

* * * * *